United States Patent

Perkins

(10) Patent No.: US 9,278,693 B2
(45) Date of Patent: Mar. 8, 2016

(54) SYSTEM AND METHOD FOR IMPROVING VEHICLE PERFORMANCE ON GRADE

(75) Inventor: William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1938 days.

(21) Appl. No.: 12/409,657

(22) Filed: Mar. 24, 2009

(65) Prior Publication Data

US 2010/0250056 A1 Sep. 30, 2010

(51) Int. Cl.
| | |
|---|---|
| *B60W 30/02* | (2012.01) |
| *B60W 30/18* | (2012.01) |
| *B60T 8/172* | (2006.01) |
| *B60T 8/175* | (2006.01) |
| *B60W 10/119* | (2012.01) |
| *B60K 23/04* | (2006.01) |
| *B60K 23/08* | (2006.01) |

(52) U.S. Cl.
CPC .......... *B60W 30/18172* (2013.01); *B60T 8/172* (2013.01); *B60T 8/175* (2013.01); *B60W 10/119* (2013.01); *B60K 23/04* (2013.01); *B60K 23/0808* (2013.01); *B60T 2210/36* (2013.01); *B60W 2530/10* (2013.01); *B60W 2550/142* (2013.01)

(58) Field of Classification Search
CPC ..................... B60W 30/18172; B60W 10/119; B60W 2550/142; B60K 23/0808
USPC ............... 701/71, 74, 82, 90, 91, 124, 37, 48; 180/233; 340/440
See application file for complete search history.

(56) References Cited

U.S. PATENT DOCUMENTS

| | | | |
|---|---|---|---|
| 5,132,906 A * | 7/1992 | Sol et al. .......................... | 701/80 |
| 5,163,530 A | 11/1992 | Nakamura et al. | |
| 5,178,231 A | 1/1993 | Watanabe et al. | |
| 5,446,658 A | 8/1995 | Pastor et al. | |
| 5,471,386 A | 11/1995 | Hrovat et al. | |
| 5,671,144 A * | 9/1997 | Ryan et al. ...................... | 701/84 |
| 5,995,895 A | 11/1999 | Watt et al. | |
| 6,163,747 A * | 12/2000 | Matsuno .......................... | 701/80 |
| 6,326,893 B1 | 12/2001 | Boschung, Jr. et al. | |
| 6,422,333 B1 | 7/2002 | Kjaer et al. | |
| 6,465,977 B1 | 10/2002 | Farkas et al. | |
| 6,556,908 B1 | 4/2003 | Lu et al. | |
| 6,564,140 B2 | 5/2003 | Ichikawa et al. | |
| 6,603,405 B2 | 8/2003 | Smith | |
| 6,604,595 B2 | 8/2003 | Sakakiyama | |
| 6,698,541 B2 | 3/2004 | Sakakiyama | |
| 6,718,248 B2 * | 4/2004 | Lu et al. .......................... | 701/70 |
| 6,752,233 B1 * | 6/2004 | Shakespear ................... | 180/248 |
| 6,909,959 B2 | 6/2005 | Hallowell | |

(Continued)

*Primary Examiner* — Thomas G Black
*Assistant Examiner* — Sara Nelson
(74) *Attorney, Agent, or Firm* — Diederiks & Whitelaw, PLC

(57) ABSTRACT

A system and method for improving vehicle performance on a grade comprises an engine, an acceleration sensor, a global positioning system, a controller and a torque transfer device. The controller determines the grade from information obtained from the global positioning system and the acceleration sensor. The controller calculates a dynamic weight shift of the vehicle from a first wheel to a second wheel due to acceleration and a static weight shift of the vehicle from the first wheel to the second wheel due to gravity and the grade. The controller then determines the maximum amount of torque that can be transmitted to the first wheel before the first wheel slips and avoids slipping by preemptively diverting torque from the first wheel to the second wheel before the first wheel slips.

20 Claims, 5 Drawing Sheets

(56) References Cited

U.S. PATENT DOCUMENTS

| | | | |
|---|---|---|---|
| 7,085,637 B2* | 8/2006 | Breed et al. | 701/38 |
| 7,092,808 B2 | 8/2006 | Lu et al. | |
| 7,168,720 B2 | 1/2007 | Fontdecaba Buj | |
| 7,239,949 B2 | 7/2007 | Lu et al. | |
| 7,308,350 B2* | 12/2007 | Brown et al. | 701/70 |
| 7,373,227 B2 | 5/2008 | Lu et al. | |
| 7,440,834 B2* | 10/2008 | Yamaguchi et al. | 701/69 |
| 7,451,033 B2 | 11/2008 | Xu et al. | |
| 7,487,028 B2* | 2/2009 | Shigeta et al. | 701/90 |
| 7,577,504 B2* | 8/2009 | Sawada et al. | 701/38 |
| 7,640,081 B2* | 12/2009 | Lu et al. | 701/1 |
| 7,835,845 B2* | 11/2010 | Lin | 701/70 |
| 2003/0181278 A1* | 9/2003 | Gradu | 475/154 |
| 2004/0054459 A1* | 3/2004 | Brooks et al. | 701/82 |
| 2004/0222027 A1* | 11/2004 | Barth et al. | 180/197 |
| 2004/0230362 A1* | 11/2004 | Post et al. | 701/84 |
| 2005/0038589 A1 | 2/2005 | Shukla | |
| 2005/0078000 A1* | 4/2005 | Ouchi | 340/440 |
| 2005/0206231 A1* | 9/2005 | Lu et al. | 303/146 |
| 2006/0074530 A1 | 4/2006 | Meyers et al. | |
| 2006/0211535 A1* | 9/2006 | Casey | 477/3 |
| 2007/0067085 A1 | 3/2007 | Lu et al. | |
| 2007/0078593 A1* | 4/2007 | Fiedler et al. | 701/124 |
| 2007/0106443 A1 | 5/2007 | Lu | |
| 2007/0129871 A1 | 6/2007 | Post, II et al. | |
| 2008/0004783 A1* | 1/2008 | Mizon et al. | 701/67 |
| 2008/0059021 A1 | 3/2008 | Lu et al. | |
| 2008/0065305 A1 | 3/2008 | Hattori et al. | |
| 2008/0147277 A1 | 6/2008 | Lu et al. | |
| 2008/0230296 A1* | 9/2008 | Gradu | 180/249 |
| 2009/0005985 A1* | 1/2009 | Basnayake | 701/214 |

* cited by examiner

SYSTEM AND METHOD FOR IMPROVING VEHICLE PERFORMANCE ON GRADE

FIELD OF THE INVENTION

The present invention pertains to a system for controlling an automotive vehicle in response to sensed conditions and, more specifically, to a system and method for improving vehicle performance on a grade based on sensed conditions.

BACKGROUND OF THE INVENTION

It is well known in the art to apply anti-skid control systems to vehicles to modify the behavior of the wheels of a motor vehicle during a braking operation. Anti-skid systems are typically designed to sequentially increase and reduce brake fluid pressure in a desirable manner to prevent the wheels from becoming locked. Known anti-skid braking control systems use various mathematical manipulations to determine the speed of a vehicle for comparison with the rotational speed of a given vehicle wheel to calculate wheel "slip" for that wheel, with wheel slip being a parameter needed in order to make decisions concerning wheel lock control.

Additionally, it is known to provide traction control systems that attempt to maximize vehicle acceleration and prevent overspin of the wheels. Many all wheel drive vehicles have drivelines with actively controlled torque transfer devices. In the case of a so called "on-demand" four wheel drive system, a powertrain delivers torque to a first set of wheels, which are considered primary drive wheels, at all times while torque sent to a second set of wheels, which are considered secondary drive wheels, only under certain conditions. For example, when the traction control system senses that traction has become limited at the first set of wheels, the torque transfer device is directed to send torque to the second set of wheels.

The prior art anti-skid and traction control systems, which are reactive in nature, are generally unsatisfactory. These systems allow the primary drive wheels to slip and then, only after the slip has been detected, the traction control system will activate the torque transfer devices to limit the slip. Of course, with such a system, a driver will sense the slipping wheels, along with a shock as the torque transfer device engages. The situation is aggravated when the vehicle is on a hill. When accelerating on a hill, the vehicle's pitch may be such that weight is transferred from the primary drive wheels, causing them to slip. The resulting momentary slip will cause driver discomfort and, even worse, could lead to vehicle instability.

Since the surface condition of a road and the slope or grade of the road surface directly affects braking and traction, some prior art control devices, such as braking control devices and traction control devices, are designed to determine a road surface coefficient of friction and a hill slope. For example, U.S. Pat. No. 5,132,906 discloses a method of estimating road surface friction and hill slope. The hill slope and road surface coefficient of friction are estimated by processing signals representing different characteristics of the vehicle. For example, with respect to each wheel, signals representing radius, speed, change in speed, rotating inertia and torque value are processed. In addition, signals related to a vehicle mass, velocity and change in velocity of the overall vehicle are processed. The calculated hill slope and road surface coefficient of friction are used to control traction as the vehicle climbs a slippery hill. Similarly, U.S. Patent Application Publication No. 2007/0129871 discloses a feed forward distribution of torque in a vehicle based on an estimated hill grade and a coefficient of friction of a road surface. The estimate of hill slope is made using wheel sensors and longitudinal acceleration sensors. Therefore, in each case, the hill slope is obtained from the output of speed sensors. The problem with using wheel speed sensors is that, on low traction surfaces, wheels tend to slip and, once they are slipping, the wheel speed sensor outputs will become erratic. With this arrangement, the torque controller will not be able to control the torque distribution in a reliable manner.

As can be seen by the above discussion, there is a need in the art for a system that will effectively distribute torque among vehicle wheels to prevent wheel slip as a vehicle travels over a slippery hill. More particularly, there is a need for such a system that does not rely on wheel speed sensors and is able to proactively prevent wheels from slipping, rather than merely reacting to wheel slippage.

SUMMARY OF THE INVENTION

The present invention is directed to a system and method for improving vehicle performance on a grade. Preferably, a first set of wheels is located in the front of the vehicle and constitutes primary drive wheels, while a second set of wheels is located in the rear of the vehicle and constitutes secondary drive wheels. The system comprises an engine, a global positioning system, at least one an acceleration sensor, a controller and a torque transfer device. The global positioning system calculates data representing an acceleration of the vehicle. The acceleration sensor senses a sum of acceleration due to vehicle acceleration along the grade and a component of gravity along the grade. The sensor provides data based on the sensed sum. The grade is determined using the data from the global positioning system and the data from the acceleration sensor. The controller calculates a dynamic weight shift of the vehicle from a first wheel or set of wheels to a second wheel or set of wheels due to the acceleration and calculates a static weight shift of the vehicle from the first wheel or set of wheels to the second wheel or set of wheels due to gravity and the grade, and determines a maximum amount of torque that can be transmitted by the first wheel or set of wheels before the first wheel or set of wheels slips. The torque transfer device adjusts the amount of torque sent to each wheel. The torque transfer device is preferably a clutch or a brake but may be constituted by one or more clutches or other devices. For instance, in the case of a hybrid vehicles the torque distribution may be accomplished by using one or more electric motors in combination with an internal combustion engine.

In use, the system obtains information about the vehicle from the global positioning system. The attitude of the vehicle or the grade of the surface on which the vehicle is traveling is determined in one or more of several ways, including: position data from global positioning system being cross referenced with the topographical data from memory to obtain the grade; stability control sensors providing information regarding roll, pitch, yaw and longitudinal, lateral and vertical acceleration; and/or suspension displacement sensors determining vehicle body shifting due to the grade and static or dynamic weight distribution. In a most preferred embodiment, the grade is determined by calculating data representing an acceleration of the vehicle from the global positioning system, sensing a sum of acceleration due to vehicle acceleration along the grade and a component of gravity along the grade with an acceleration, determining the acceleration due to gravity along the grade by subtracting the calculated data from the sum, and determining the grade from the acceleration due to gravity along the grade and a known value of gravity in a vertical direction. When the vehicle is climbing a hill, the acceleration sensor senses longitudinal acceleration. When the vehicle is traversing a hill, the acceleration sensor senses lateral acceleration. The controller calculates a dynamic weight shift of the vehicle from the first wheel or set of wheels to the second wheel or set of wheels due to the acceleration and a static weight shift of the vehicle from the first wheel or set of wheels to the second wheel or set of wheels due to both gravity and the grade. The controller then determines the maximum amount of torque that can be transmitted to each wheel before the wheels slip. The system avoids slipping of the first wheel or set of wheels by preemptively diverting torque from the first wheel or set of wheels to the second wheel or set of wheels when the first wheel or set of wheels is about to slip. A memory contains topographical data and also stores information regarding a history of wheel slippage so that the controller can use the information to adjust maximum torque limits. In addition, a weather monitoring device is preferably employed to detect weather condition that may affect the maximum torque limits.

Additional objects, features and advantages of the present invention will become more readily apparent from the following detailed description of a preferred embodiment when taken in conjunction with the drawings wherein like reference numerals refer to corresponding parts in the several views.

DESCRIPTION OF THE PREFERRED EMBODIMENT

Figure 1:
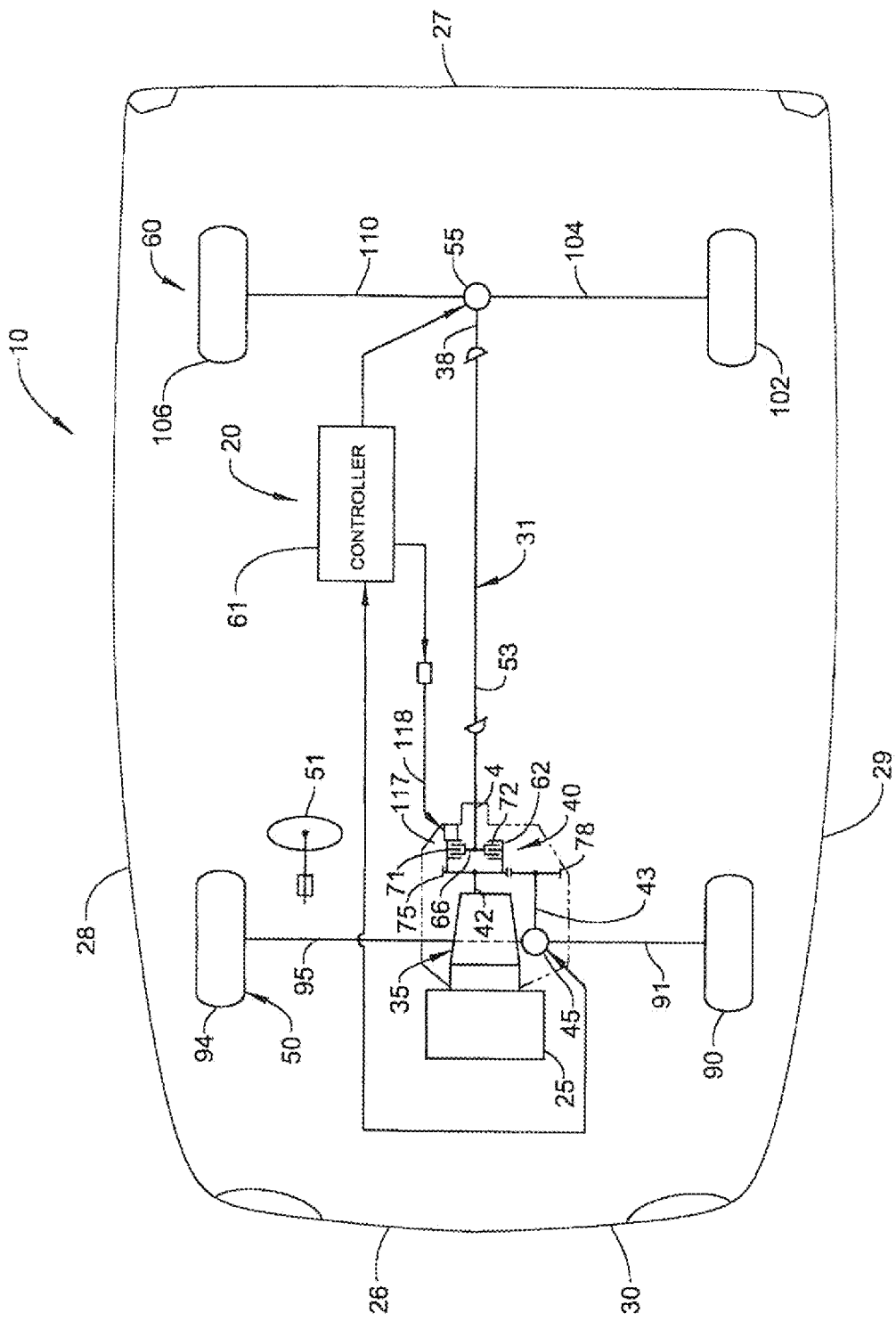
FIG. 1 depicts a vehicle incorporating a system for improving vehicle performance according to a preferred embodiment of the invention.

With initial reference to FIG. 1, there is shown a schematic view of a vehicle 10 incorporating a system 20 for improving vehicle performance on a grade. As illustrated, a power source, such as an internal combustion engine 25, is mounted in vehicle 10. In addition, vehicle 10 includes a front 26, a back 27, a right side 28, a left side 29 and a body 30 that supports engine 25 along with other portions of a powertrain generally indicated at 31. Power from engine 25 is transmitted to a transmission 35, then through a transfer clutch 40 where a transmission output shaft 42 creates a split torque path. A first, front drive shaft 43 of the torque path extends to a front differential 45 and then to a first set of wheels 50. A steering wheel 51 controls the angular positioning of first set of wheels 50 so that a driver may steer vehicle 10. A second, rear drive shaft 53 of the torque path extends to a rear differential 55 and then to a second set of wheels 60. A controller 61 controls transfer clutch 40, front differential 45 and rear differential 55 as more fully discussed below.

Vehicle 10 is shown as an all wheel drive vehicle in which first set of wheels 50 is a primary set of drive wheels and is located in front 26 of vehicle 10. However, any type of all wheel powertrain arrangement, including an arrangement that primarily drives rear wheels 60 or an arrangement that primarily drives all wheels 50, 60 at once could be employed. Furthermore, transmission 35 may be an automatic transmission with a torque converter or a manual transmission with a main clutch. In addition, although shown with an internal combustion engine 25, other types of drive arrangements, including hybrid drive systems, could be utilized.

In the embodiment shown, transfer clutch 40 selectively transfers torque to either first set of wheels 50 or to second set of wheels 60. Basically, transfer clutch 40 includes a clutch drum 62 mounted on transmission output shaft 42 and a clutch hub 66 mounted to rear drive shaft 53. Between clutch drum 62 and clutch hub 66 there are several interleaved drive plates 71 and driven plates 72. More specifically, drive plates 71 are connected to clutch drum 62, while driven plates 72 are connected to clutch hub 66. Clutch drum 62 is fixed to a transfer drive gear 75 meshing with a front drive gear 78 mounted to front drive shaft 43 which, in turn, is connected to front differential 45. A left front wheel 90 is connected to front differential 45 through a left front wheel drive shaft 91 and a right front wheel 94 is connected to front differential 45 through a right front wheel drive shaft 95. Rear drive shaft 53 is connected to a left rear wheel 102 through rear differential 55 and a left rear wheel drive shaft 104, while a right rear wheel 106 is connected to rear differential 55 through a right rear wheel drive shaft 110.

Several portions of powertrain 31 may be considered torque transfer devices. For example, transfer clutch 40 is equipped with an actuator 117, such as a hydraulic piston, connected to controller 61 through control lines 118. Normally, torque will travel through transfer drive gear 75 to front drive gear 78, then to front differential 45 and finally to first set of wheels 50. However, when controller 61 directs pressure to be applied to actuator 117 and drive plates 71 start to transfer torque to driven plates 72, torque is sent through rear drive shaft 53 to second set of wheels 60. As the pressure increases, more torque is transferred from first set of wheels 50 to second set of wheels 60. Preferably, front differential 45 is equipped in a known manner with friction elements (not shown) to allow front differential 45 to selectively send a desired amount of torque to left front wheel 90 or right front wheel 94. Similarly, rear differential 55 is equipped with friction elements (not shown) to allow rear differential 55 to selectively send a desired amount of torture to left rear drive wheel 102 or right rear drive wheel 106. When front differential 45 and rear differential 55 are controlled in synchronism by controller 61 through lines 118, torque can be transferred selectively between left wheels 90, 102 and right wheels 94, 106. Furthermore, transfer clutch 40, front differential 45 and rear differential 55 may collectively be considered a torque transfer device. While any one of left front wheel 90, right front wheel 94, left rear drive wheel 102 or right rear drive wheel 106 may be considered a first wheel and any other of the wheels (90, 94, 102, and 106) may be considered a second wheel such that when torque transfer device (40, 45, 55) is controlled by controller 61, torque may distributed from the first wheel to the second wheel.

It should be noted that four wheel drive or all wheel drive systems are known and the above should be considered as an exemplary drive arrangement. Therefore, it should be understood that other four wheel drive systems may be employed, including using traction motors to drive all four wheels, a traction motor driving two wheels while the other two wheels are driven by an internal combustion engine through a powertrain, or the like. Of particular importance to the present invention is the inclusion and operation of system 20 for improving vehicle performance on a grade.

Figure 2:
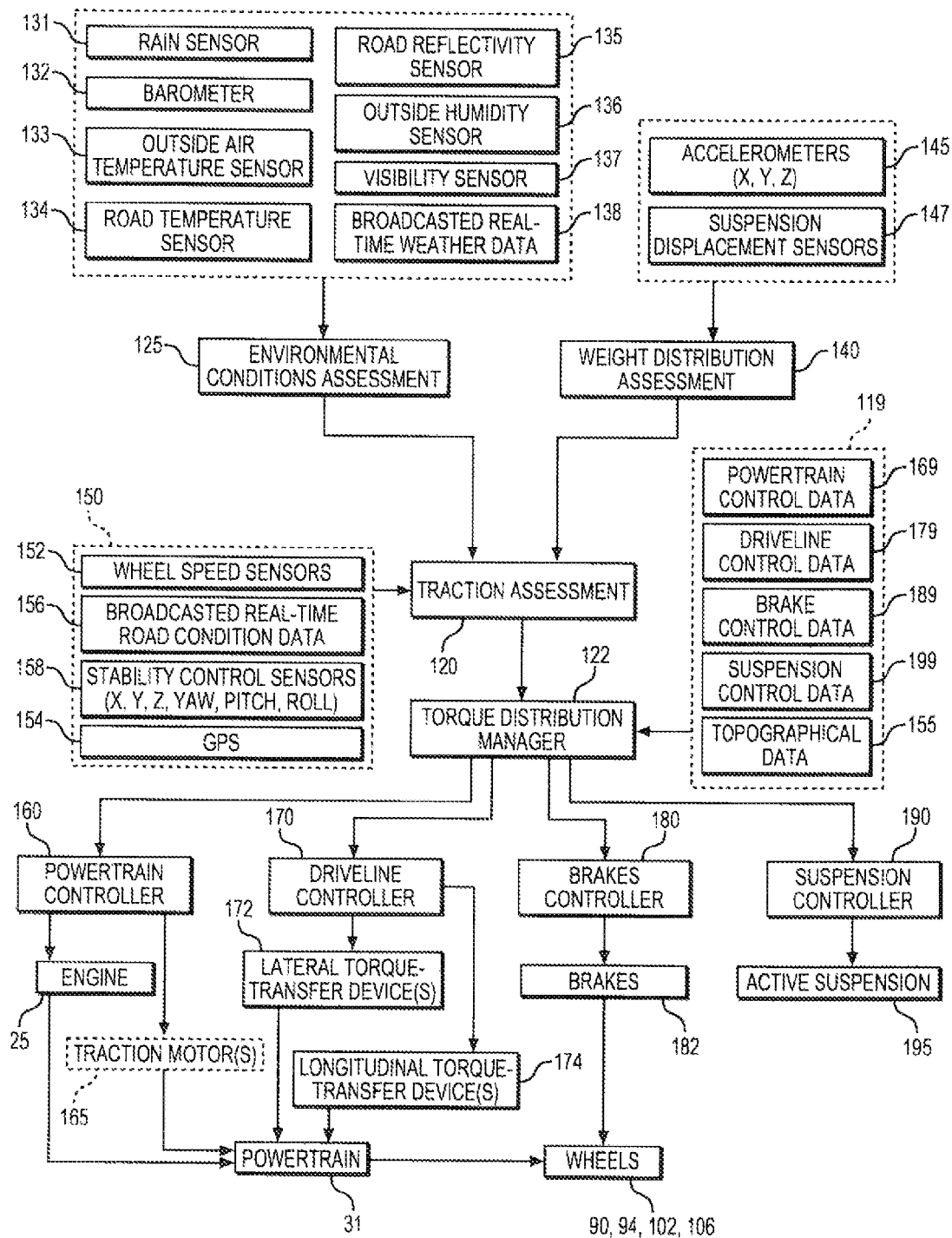
FIG. 2 is a functional block diagram of the system of FIG. 1.

Turning now to FIG. 2, there is shown a functional block diagram of system 20. System 20 comprises a memory and processing device 119 and a traction assessment unit 120 that calculates the appropriate amount of torque to send to each of wheels 90, 94, 102 and 106. Traction assessment unit 120 receives information from various sources on vehicle 10. Appropriate signals are then sent from traction assessment unit 120 to a torque distribution manager 122 that, in turn, sends signals to various controllers so that appropriate actions can be taken to provide the appropriate amount of torque to each wheel 90, 94, 102, 106. The various control units, sensors and data utilized in connection with the system and method of the invention will now be individually described.

Environmental Conditions Assessment

A weather or environmental conditions assessment unit 125 preferably obtains information from several sensors. For example, a rain sensor 131 is used to detect various forms of precipitation. A barometer 132 is used to detect ambient air pressure, while an outside air temperature sensor 133 and a road temperature sensor 134 help in determining road conditions needed to predict icing. A road reflectivity sensor 135 also aids in detecting ice. The environmental conditions assessment unit 125 can also use an outside humidity sensor 136, a visibility sensor 137 and broadcasted realtime weather data 138. Generally, such input is useful in detecting and predicting how slippery the road's surface is and how slippery it may become. From this information, the environmental conditions assessment unit 125 can determine a coefficient of friction of the road surface that is useful to traction assessment unit 120.

Weight Distribution

A weight distribution assessment unit 140 preferably obtains information from accelerometers 145 and suspension displacement sensors 147. Accelerometers 145 are preferably arranged to measure acceleration for vehicle 10 in the X, Y and Z directions. Such information is directly useful to traction assessment unit 120, especially to determine the normal force applied by a given road surface at wheels 90, 94, 102 and 106. Suspension displacement sensors 147 are also preferably provided and measure the vehicles response to changing road conditions, such as the presence of a hill or grade.

Additional Sensors and Data

Another group of sensors 150 preferably includes the following types of sensors. Wheel speed sensors 152 provide information needed to determine wheel slip. A Global Positioning System (GPS) 154 provides data to determine vehicle speed and acceleration in longitudinal and lateral directions. Additionally, GPS position data can be used along with topographical data 155 to determine if vehicle 10 is approaching a hill or grade. Global positioning system 154 also works in combination with broadcasted real-time road condition data 156 to determine the traffic and road repair conditions. Stability control sensors 158 provide information regarding yaw, pitch and roll, as well as longitudinal, lateral, and vertical accelerations. Instead of having separate stability control sensors 158, the information may be obtained from acceleration sensors 145 used by weight distribution assessment unit 140.

Powertrain Controller

A powertrain controller 160 receives information regarding requested torque and then provides the appropriate control signals to engine 25. In the case of a hybrid vehicle, powertrain controller 160 also sends appropriate control signals to traction motors indicated at 165, each of which sends torque to powertrain 31. Powertrain controller 160 generates data 169 regarding powertrain 31 and sends data 169 back to torque distribution manager 122.

Driveline Controller

A driveline controller 170 provides instructions to both lateral torque transfer devices 172, such as front and rear differentials 45 and 55, and to longitudinal torque transfer devices 174, such as transfer clutch 40. Transfer devices 172, 174 directly control the flow of torque to the various wheels 90, 92, 102 and 106. Driveline controller 170 also generates driveline control data 179 and sends data 179 back to torque distribution manager 122.

Brake Controller

A brake controller 180 controls brakes 182 for each of wheels 90, 92, 94 and 106. The brakes 182 may be used not only to slow vehicle 10 but also to selectively transfer torque away from a particular wheel. Brake controller 180 also generates brake control data 189 and sends data 189 back to torque distribution manager 122.

Suspension Controller

A suspension controller 190 is used to control an active suspension 195 that can vary the ride height, the amount of suspension damping and the allowed suspension displacement provided at each wheel 90, 94, 102 and 106 in order to modify weight transfer and traction. Suspension controller 190 also generates suspension control data 199 and sends data 199 back to torque distribution manager 122. Alternatively, a semi-active suspension or passive suspension could be used, though controllability is reduced with these systems.

Figure 3:
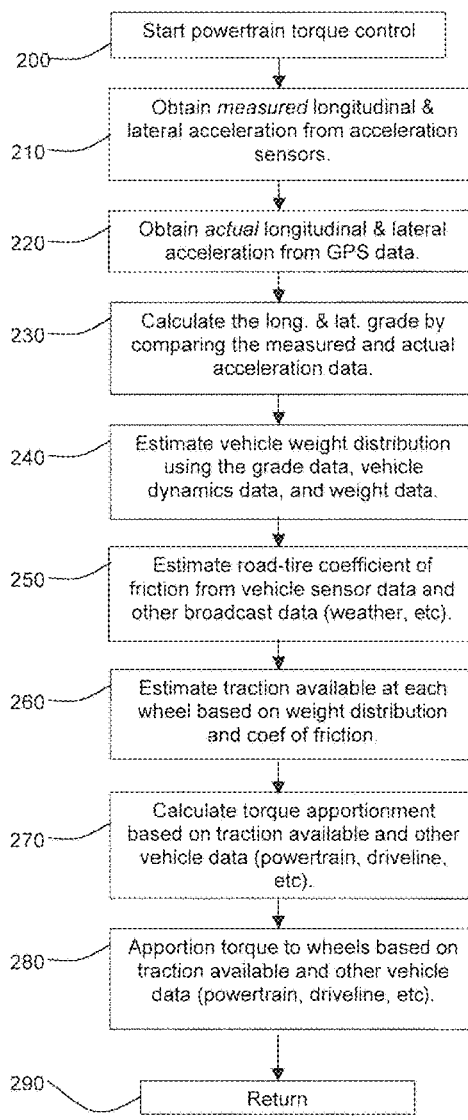
FIG. 3 is a flowchart showing a torque control routine according to the system of FIG. 1.

FIG. 3 is a flowchart showing a preferred torque control routine for controlling system 20 shown in FIG. 1 and depicts steps in a method of controlling torque distribution between wheels 90, 94, 102, 106 of vehicle 10 on a surface having a grade. Generally, as more fully set forth below, system 20 will prevent wheels from slipping when vehicle 10 is on a grade. The method is initiated at a first step indicated at 200. The method proceeds to a step 210 of obtaining measured data of vehicle 10 from acceleration sensors 145. Acceleration sensors 145 will preferably measure an actual acceleration in at least the longitudinal and lateral directions. Next, at step 220, data from global positioning system 154 is obtained, including vehicle acceleration data.

In step 230, the measured acceleration from sensors 145 is compared to the data obtained from global positioning system 154 to ascertain longitudinal and lateral grade. Other methods of grade determination may be used. One alternative method includes cross-referencing vehicle position data from global positioning system 154 with topographical data 155 stored in memory and processing device 119, including the grade of the ground surface at any given point. Another method used suspension displacement sensors 147 in combination with other data to estimate the grade. Another method can include using actual pitch and roll data from inclinometer-type sensors (not shown). However, the most preferred embodiment primarily uses the accelerometer data and global positioning system data to estimate grade. Collectively, any one or more of these sensors are considered an attitude sensor.

The method then estimates, at step 240, static and dynamic weight distribution between front wheels 90, 94 and rear wheels 102, 106, using to grade data, acceleration data and vehicle weight data. Weight data is preferably prescribed or estimated, for example, by suspension displacement sensors 147, but other methods may be used. At step 250, the coefficient of friction between wheels 90, 94, 102, 106 and the road surface is estimated using vehicle sensor data and broadcast data provided by sensors 150 and environmental control assessment unit 125. Next, at step 260, the traction force available at each wheel 90, 94, 102, 106 is estimated using the coefficient of friction estimate and weight distribution estimate. At step 270, the magnitude and distribution of torque is calculated and requested from torque distribution manager 122 based on vehicle data from memory and processing device 119 and traction assessment unit 120. At step 280, powertrain controller 160, driveline controller 170, brakes controller 180 and/or suspension controller 190 execute the torque magnitude and distribution requests. Finally, at step 290, the next iteration of the process begins, which maintains or modifies torque distribution based on updated data and provided feedback. As can be seen from the above discussion this method applies equally when transferring torque from any one of wheels 90, 94, 102, 106, which may be considered a first wheel, to any other of wheels 90, 94, 12, 106, which may be considered a second wheel.

Figure 4:
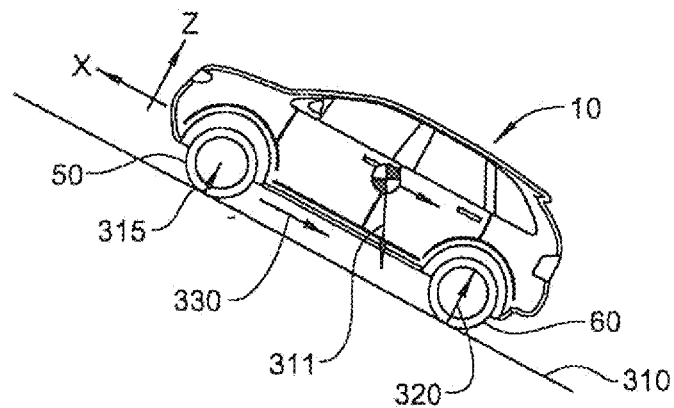
FIG. 4 is a side view of the vehicle of FIG. 1 climbing a hill.

An example of this process is described with reference to FIG. 4 where vehicle 10 is shown climbing a hill. A surface 310 has a steep, uphill grade such that first set of wheels 50, in this case front wheels 90, 94, are much higher than second set of wheels 60, in this case rear wheels 102, 106, such that a weight 311 associated with vehicle 10 shifts rearward. As a result, a normal force 315 applied by surface 310 to front wheels 50 is much less than a normal force 320 applied by surface 310 to rear wheels 60. Because normal force 320 at rear wheels 60 is much greater than normal force 315 at front wheels 50, much greater traction exists at rear wheels 60. When engine 25 applies a propulsive torque, the torque would normally be initially sent to front wheels 50. However, front wheels 50 will have a propensity to slip. To counter this tendency, a torque transfer device, such as transfer clutch 40, is preemptively engaged to transfer torque, which would normally be sent to front wheels 50, to rear wheels 60, such as indicated by arrow 330, to prevent slip. The slip is prevented at front wheel set 50 because the amount of torque transmitted through front wheels 50 drops to below the amount that will cause slip given the relatively small amount of normal force 315 provided at front wheels 50. Rear wheels 60 will not slip even with the addition of the extra torque provided by torque transfer device 40 because normal force 320 at rear wheels 60 is relatively large compared to normal force 315 found at front wheels 50. Of course, if surface 310 is slippery enough, both front wheels 50 and rear wheels 60 could slip, even with torque transfer 330 from front wheels 50 to rear wheels 60. However, the coefficient of friction estimate provided at step 250 discussed above will assist controller 61, shown in FIG. 1, to calculate the appropriate magnitude of torque delivery to prevent slip.

Figure 5:
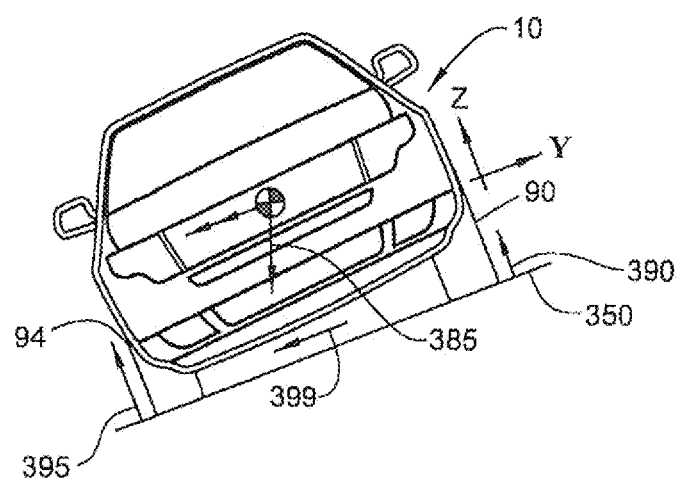
FIG. 5 is a front view of the vehicle of FIG. 1 traversing a side slope.

Another example of the control process of the invention is described with reference to FIG. 5 where vehicle 10 is shown traversing a hill. Surface 350 is at a relatively high, sidesloping grade such that a first set of wheels, in this case left side wheels 90, 102, is much higher than a second set of wheels, in this case right side wheels 94, 106. For the sake of this particular example, only front left wheel 90 and front right wheel 94 are discussed because they are preferably the primary drive wheels. As a result, in a normal force 390 applied by surface 350 to left side wheel 90 is much less than a normal force 395 applied by surface 350 to right side wheel 94. Because normal force 395 at right side wheel 94 is much greater than normal force 390 applied by surface 350 to left side wheel 90, much greater traction exists at right side wheel 94. When engine 25 applies a propulsive torque, the torque will preferably be sent in equal amounts to both left and right wheels 90, 94. When engine torque is sent equally to front left wheel 90 and front right wheel 94, front left wheel 90 will have a propensity to slip before right front wheel 94. To counter this tendency, a torque transfer device, such as front differential 45, will be engage to divert a lateral torque, represented by arrow 399, from front left wheel 90 to front right wheel 94 to prevent wheel slip.

Figure 6:
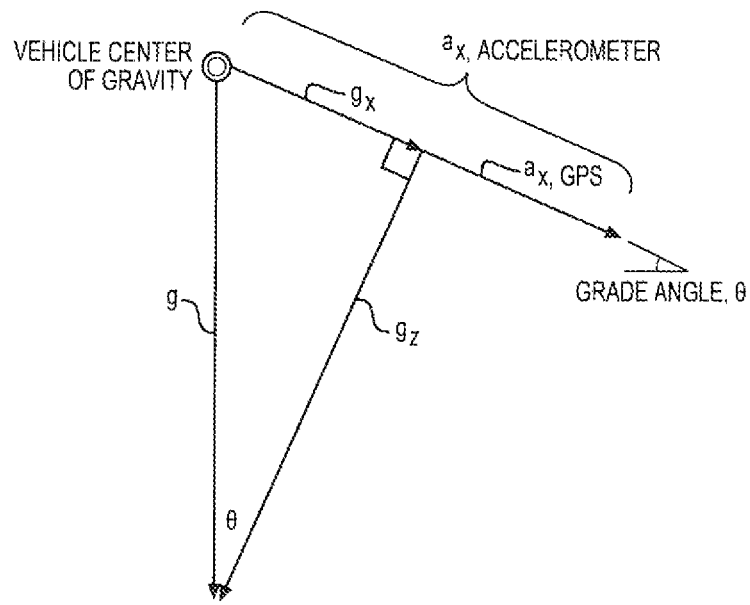
FIG. 6 is a schematic showing how a longitudinal surface grade is determined.
Figure 7:
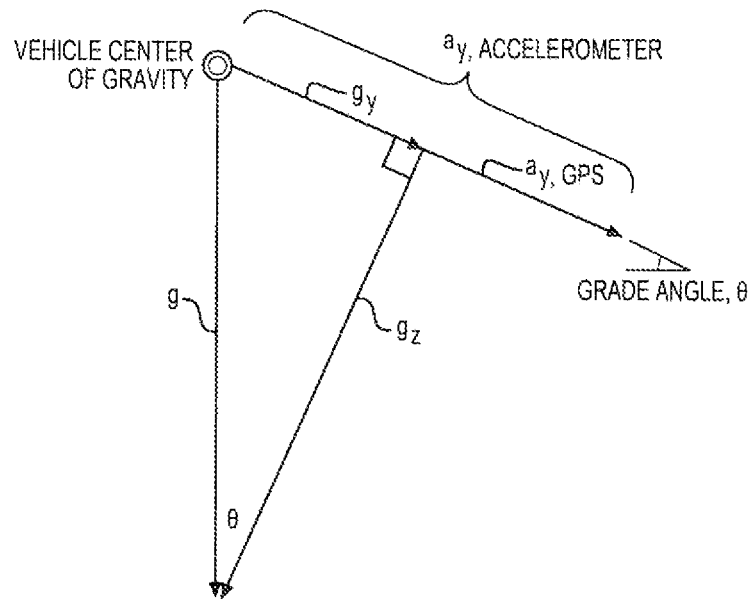
FIG. 7 is a schematic showing how a lateral surface grade is determined.

While multiple variations, particularly in connection with grade calculations, have been described above, in the most preferred embodiment, the surface grade is determined from GPS data. Turning now to FIGS. 6 and 7 there is shown examples of how a longitudinal surface grade is determined and how a lateral surface grade is determined. In FIG. 6 schematic forces of interest acting on vehicle 10 are shown for determining longitudinal grade. Gravity g is known and is preferably stored in memory and processing device 119. The acceleration in the longitudinal direction $a_{x,acc}$ measured by accelerometers 145 or stability control sensors 158 is actually the sum of the acceleration g, due to gravity in the longitudinal direction plus the acceleration of vehicle 10 in the longitudinal direction. Unfortunately, most accelerometers cannot differentiate between these two types of acceleration. Therefore, an acceleration $a_{x,gps}$ from data obtained from global positioning system 154 is calculated by determining the change in position per unit time to obtain velocity and then determining the change in velocity per unit time to obtain acceleration. The result $a_{x,gps}$ represents only the acceleration due to vehicle 10 in the longitudinal direction. Therefore the acceleration due to gravity $g_x$ can be found from the following formula: $g_x=a_{x,acc}-a_{x,gps}$. Using trigonometry, the longitudinal grade of the surface 310 can be calculated from the following formula: Longitudinal Grade %=100*$g_x/g_z$=100*tan(sin$^{-1}$($g_x/g$))

With this method surface grade is quickly and easily determined. Of course since global positioning systems measure change in position on a sphere, the above method simply provides an accurate estimate of grade. For small changes in position, the global positioning system provides a fairly accurate measure of acceleration in the horizontal direction but does not account very well for the change in elevation between two points. In other words the $a_{x,gps}$ is more accurately a measure of acceleration in the horizontal direction, not acceleration along the surface 310. Regardless the method of determining acceleration based on determining grade as described above surprisingly provides much better results than the prior art method of measuring wheel speed for determining actual vehicle acceleration.

In FIG. 7 forces of interest acting on vehicle 10 are shown for determining lateral grade. The analysis is analogous to the way longitudinal grade is determined as discussed above in relation to FIG. 6 above. In FIG. 7, the acceleration $a_{y,acc}$ is the sum of the $g_y$ acceleration due to gravity in the lateral direction plus the acceleration of vehicle 10 in the lateral direction. An acceleration $a_{y,gps}$ represents only the acceleration due to vehicle 10 in the lateral direction. Therefore the acceleration due to gravity $g_y$ can be found from the formula: $g_y=a_{y,acc}-a_{y,gps}$. Using trigonometry, the lateral grade of the surface 310 can be calculated from the following formula: Lateral Grade %=100*$g_y/g_z$=100*tan(sin$^{-1}$($g_y/g$)).

As can be seen from the above discussion of the invention, there is provided a system and method for improving vehicle performance on a grade by preemptively diverting torque so that the vehicle's wheels will not slip. Although described with reference to a preferred embodiment of the invention, it should be readily understood that various changes and/or modifications could be made to the invention without departing from the spirit thereof. For instance, the inventive concept of shifting torque from right to left or left to right wheels also applies to rear wheels in an arrangement in which the rear wheels are the primary drive wheels and also to both left and right wheels in a full time four wheel drive arrangement.

Furthermore, when all four wheels are potentially driven, the inventive concepts of both the first and second examples may be combined such that a vehicle traversing and climbing a hill could be equipped with a dual acting system. In general, the invention is only intended to be limited by the scope of the following claims.

The invention claimed is:

1. In a vehicle having a front, rear, left side and right side, a system for improving vehicle performance on a surface oriented at a grade, said system comprising:
    an engine;
    a global positioning system for calculating data representing an acceleration of the vehicle;
    an acceleration sensor for sensing a sum of acceleration due to vehicle acceleration along the grade and a component of gravity along the grade and providing data based on the sensed sum;
    a controller for determining the grade using the data from the global positioning system and the data from the acceleration sensor, calculating a dynamic weight shift of the vehicle from a first wheel to a second wheel due to the vehicle acceleration, calculating a static weight shift of the vehicle from the first wheel to the second wheel due to the gravity and the grade, and determining a maximum amount of torque that can be transmitted by the first wheel before the first wheel slips; and
    a torque transfer device for adjusting an amount of torque sent to each of the first and second wheels, whereby slipping of the first wheel is avoided by the controller preemptively by diverting torque from the first wheel to the second wheel through the torque transfer device so that an amount of torque sent to the first wheel is less than the maximum amount of torque.

2. The system according to claim 1, further comprising a weight distribution assessment unit.

3. The system according to claim 2, further comprising suspension displacement sensors that provided data to the weight distribution assessment unit and a memory which contains information used to estimate weight data.

4. The system according to claim 3, further comprising an environmental conditions assessment unit for providing information about a coefficient of friction of the surface.

5. The system according to claim 4, wherein the environmental conditions assessment unit obtains data from at least one of a rain sensor, a barometer, an outside air temperature sensor, a road temperature sensor, a road reflectivity sensor, an outside humidity sensor, a visibility sensor and broadcasted real time weather.

6. The system according to claim 5, further comprising: a traction assessment unit that uses information from wheel speed sensors, broadcasted real-time road condition data, stability control sensors, the environmental assessment unit and the weight distribution assessment unit.

7. The system according to claim 6, further comprising: a torque distribution manager which collects information from the traction assessment unit and uses controllers to distribute torque.

8. The system according to claim 7, wherein the controllers are selected from the group consisting of a powertrain controller, a driveline controller, a brake controller and a suspension controller.

9. The system according to claim 1, wherein the first wheel is a primary drive wheel and the second wheel is a secondary drive wheel.

10. The system according to claim 1, wherein the first wheel is one of a primary drive wheel and a secondary drive wheel and the second wheel is the other of the primary drive wheel and the secondary drive wheel.

11. The system according to claim 10, wherein the first wheel is located in the left side of the vehicle and the second wheel is located in the right of the vehicle.

12. The system according to claim 1, further comprising a weather monitoring device used to detect weather which may affect the maximum amount of torque distributed to each of the first and second wheel.

13. The system according to claim 1, further comprising a memory device for storing information regarding a history of wheel slippage of the vehicle, said controller utilizing the history of wheel slippage information to adjust the maximum amount of torque distributed to each of the first and second wheel.

14. A method of controlling torque distribution between first and second wheels of a vehicle on a surface having a grade comprising:
    obtaining information about the vehicle from a global positioning system;
    sensing an acceleration of the vehicle using the information obtained from both the global positioning system and an acceleration sensor;
    calculating a dynamic weight shift of the vehicle from a first wheel to a second wheel due to the acceleration;
    calculating the grade of the surface utilizing the information obtained from both the global positioning system and the acceleration sensor;
    calculating a static weight shift of the vehicle due to gravity and the grade;
    determining a maximum amount of torque that can be transmitted to the first wheel before the first wheel slips; and
    preemptively diverting torque from the first wheel through a torque transfer device to the second wheel to avoid slipping of the first wheel.

15. The method according to claim 14, further comprising monitoring weather that may affect the maximum amount of torque delivery, diverting the torque based on the weather and limiting the torque delivery based on the weather.

16. The method according to claim 15, wherein monitoring the weather includes using data from at least one of a rain sensor, a barometer, an outside air temperature sensor, a road temperature sensor, a road reflectivity sensor, an outside humidity sensor, a visibility sensor and broadcasted real time weather.

17. The method according to claim 14, further comprising storing information regarding a history of wheel slippage and using the history of wheel slippage information to adjust the maximum amount of torque delivery.

18. The method according to claim 14, wherein calculating the grade includes calculating data representing an acceleration of the vehicle from the global positioning system, sensing a sum of acceleration due to vehicle acceleration along the grade and a component of the gravity along the grade, determining the acceleration due to the gravity along the grade by subtracting the calculated data from the sum, and determining the grade from the acceleration due to the gravity along the grade and a known value of the gravity in a vertical direction.

19. The method according to claim 14, wherein determining the grade includes utilizing signals received from suspension displacement sensors.

20. The method according to claim 14, wherein determining the grade includes utilizing signals received from stability control sensors, including roll, pitch and yaw data, and longitudinal, lateral, and vertical acceleration data.

* * * * *